(12) United States Patent
Corley

(10) Patent No.: US 9,381,976 B1
(45) Date of Patent: Jul. 5, 2016

(54) MONOPOD FOR MARINE VESSELS FOR POWERING AND USING OF ELECTRICAL AND NON-ELECTRICAL ACCESSORIES AND METHOD OF ATTACHMENT

(71) Applicant: Christian L. Corley, Olathe, KS (US)

(72) Inventor: Christian L. Corley, Olathe, KS (US)

(*) Notice: Subject to any disclaimer, the term of this patent is extended or adjusted under 35 U.S.C. 154(b) by 0 days.

(21) Appl. No.: 14/660,626

(22) Filed: Mar. 17, 2015

Related U.S. Application Data

(60) Provisional application No. 62/108,136, filed on Jan. 27, 2015, provisional application No. 62/107,704, filed on Jan. 26, 2015.

(51) Int. Cl.
| | |
|---|---|
| F16M 11/28 | (2006.01) |
| B63B 45/04 | (2006.01) |
| F21V 19/02 | (2006.01) |
| F21S 8/04 | (2006.01) |
| B63B 17/00 | (2006.01) |
| B63B 49/00 | (2006.01) |
| H01R 24/76 | (2011.01) |
| H01R 27/02 | (2006.01) |
| H01R 43/20 | (2006.01) |

(52) U.S. Cl.
CPC ............... *B63B 17/00* (2013.01); *B63B 49/00* (2013.01); *H01R 24/76* (2013.01); *H01R 27/02* (2013.01); *H01R 43/20* (2013.01)

(58) Field of Classification Search
CPC ...... H01R 31/065; H01R 31/06; F16M 11/28; A61M 5/1415; B63B 45/04; B63B 45/02; F21V 19/02; F21S 8/04
See application file for complete search history.

(56) References Cited

U.S. PATENT DOCUMENTS

| | | | |
|---|---|---|---|
| 1,351,817 A * | 9/1920 | Walters | ............ A47F 8/02 |
| | | | 223/92 |
| 4,625,742 A | 12/1986 | Phillips | |
| 5,331,990 A | 7/1994 | Hall et al. | |
| 5,588,735 A | 12/1996 | Harada | |
| 5,704,704 A | 1/1998 | Reichard et al. | |
| 5,973,618 A | 10/1999 | Ellis | |
| 6,368,157 B1 | 4/2002 | Bottazi et al. | |
| 6,685,145 B2 * | 2/2004 | Mackay | ............ G10G 5/00 |
| | | | 248/125.1 |
| 6,855,003 B1 | 2/2005 | Wyant | |

(Continued)

FOREIGN PATENT DOCUMENTS

DE 202005009976 9/2005

OTHER PUBLICATIONS

Bits and Pieces, "Hi-Tech LED Walking and Hiking Staff", http://www.bitsandpieces.com/product/hitech_led_walking_and_hiking_staff/multi_function_gadgets?p=0939377&utm_medium=shopping_engine&CAWELAID=120020260000000612& CAGPSPN=pla&gclid=Cj0KEQjwrPqnBRD56dGe1o_WIZsBEiQAb5ugt2el7XodvDsL5vXs0gubTxfJKo-OLP1nYpD4nbK08, 2014.

(Continued)

*Primary Examiner* — Gary Paumen
(74) *Attorney, Agent, or Firm* — Law Office of Mark Brown, LLC; Christopher M. DeBacker

(57) ABSTRACT

A monopod for mounting to the navigation light power port of a marine vessel, such as a bass boat or speed boat, which provides power for mobile accessories, such as cameras and smart phones. The monopod may be fitted with extendable, bendable arms for mounting additional cameras or for providing additional accessories. An embodiment of the monopod includes an extension arm which may be maneuvered and bent such that it provides a fisherman access to multiple accessories even while the fisherman is located in the fishing chair of a bass boat.

15 Claims, 9 Drawing Sheets

(56) References Cited

U.S. PATENT DOCUMENTS

| | | | |
|---|---|---|---|
| 7,017,598 B2* | 3/2006 | Nipke | A45B 3/00 135/16 |
| 7,422,351 B2 | 9/2008 | Villani | |
| 7,500,881 B1 | 3/2009 | Lin | |
| 8,011,930 B2* | 9/2011 | Lee | H01R 13/6675 439/18 |
| 8,337,035 B2 | 12/2012 | Lu | |
| 8,547,056 B2* | 10/2013 | Chang | H02J 7/0042 320/107 |
| 8,629,651 B2 | 1/2014 | Guccione et al. | |
| 8,754,609 B2 | 6/2014 | Tsai et al. | |
| 8,823,319 B2 | 9/2014 | Von Novak, III et al. | |
| 8,873,233 B2 | 10/2014 | Reber et al. | |
| 8,944,399 B2 | 2/2015 | Sutherland et al. | |
| 2007/0279922 A1* | 12/2007 | Villani | B63B 45/04 362/477 |
| 2009/0255561 A1 | 10/2009 | Brown | |
| 2010/0130065 A1* | 5/2010 | Teague | B64C 9/22 439/640 |
| 2013/0278207 A1 | 10/2013 | Yoo | |
| 2014/0030929 A1* | 1/2014 | Cracco | H01R 29/00 439/638 |
| 2014/0210406 A1 | 7/2014 | Na et al. | |
| 2015/0002088 A1 | 1/2015 | D'Agostino | |
| 2015/0316837 A1* | 11/2015 | Maltese | G03B 17/561 294/139 |
| 2015/0344116 A1* | 12/2015 | McLeroy | B63B 45/02 362/477 |
| 2015/0346590 A1* | 12/2015 | Lewis | G03B 17/561 362/109 |
| 2015/0351531 A1* | 12/2015 | Dalton | A47B 23/007 248/558 |

OTHER PUBLICATIONS

Excel-Outdoors.com, "Power Plug", http://excel-outdoors.com/products/excel-outdoors-power-plug, 2015.

Gander Mountain, "Goal Zero Switch 8 Power Source", http://www.gandermountain.com/modperl/product/details.cgi?pdesc=Goal-Zero-Switch-8-Power-Source&i=785207&r=view&cvsfa=2586&cvsfe=2&cvsfhu=373835323037&kpid=785207&gclid=Cj0KEQjwrPqnBRD56dGe1o_WIZsBEiQAb5ugtwROQCsK253KG-HoDs-32QpQu-N5XQcy4WFOLIA5B9QaAo__18P8, 2013.

Gizmag.com, "The Slik-Stik nexgen high-tech walking stick", http://www.gizmag.com/the-slik-stik-nexgen-high-tech-walking-stick/11293/, Mar. 20, 2009.

Kayalu Gear, ""General Into about the Radpole Assembly"", http://www.kayalu.com/k/radpole-portable-ram-mounts-navigation-kayak-light-camera-mount-fishing-pole-mount__page__2.php, 2015, 1-3.

R & R Associates, "The New Generation Cane", http://www.mrassociates.com/wordpress/the-new-generation-cane/, Mar. 7, 2013.

Seachoice Products, "2012 Marine Accessories Catalog", http://www.seachoice.com/products, 2012, 8.

* cited by examiner

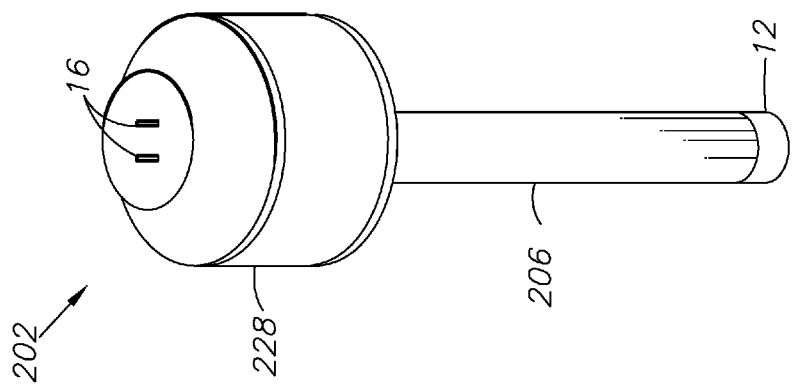
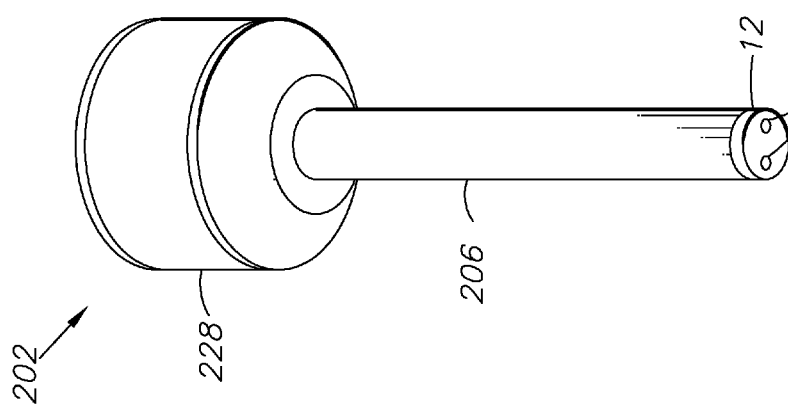

MONOPOD FOR MARINE VESSELS FOR POWERING AND USING OF ELECTRICAL AND NON-ELECTRICAL ACCESSORIES AND METHOD OF ATTACHMENT

CROSS-REFERENCE TO RELATED APPLICATIONS

This application claims priority in U.S. Provisional Patent Application No. 62/108,136, filed Jan. 27, 2015, and also claims priority in U.S. Provisional Patent Application No. 62/107,704, filed Jan. 26, 2015, both of which are incorporated herein by reference.

BACKGROUND OF THE INVENTION

1. Field of the Invention

The present invention relates generally to a monopod marine vessel accessory, and more specifically to a monopod which connects with the navigation light socket port(s) of a marine vessel and may provide power to mobile accessories.

2. Description of the Related Art

Many boating enthusiasts, from professional bass fisherman such as Casey Scanlon, to extreme water sport performers, desire to record their sporting feats using cameras such as GoPro® cameras manufactured by GoPro, Inc. of San Mateo, Calif. and other action cameras, including but not limited to the Garmin Virb®, manufactured by Garmin Ltd. of Olathe, Kans., and the iON™ action camera, manufactured by iON America, LLC of Moorestown, N.J. Other more casual boating enthusiasts, such as Roger Corley, may wish to similarly record family activities, charge mobile computing devices, or otherwise provide power to accessories or method of attachment for accessories while on a marine vessel.

Presently there are capabilities of providing power to mobile accessories using 12V ports (a.k.a. cigarette lighters). However, many boats, and certainly most older boats, lack such a power port. Similarly, when that power port exists in a boat, it typically is located near the steering column and not near the rear and/or front of the boat where activity generally occurs.

What is needed is a power solution for mobile devices, including smart phones, cameras, and other electronic devices consumers may want aboard, which is compatible for mounting non-electronic accessories also, and further which is compatible with virtually all marine vessels, which offers flexibility and versatility for multiple water sports and activities.

Heretofore there has not been available a monopod for marine vessels with the advantages and features of the present invention.

SUMMARY OF THE INVENTION

The present invention generally provides a monopod for mounting to the navigation light power port of a marine vessel, such as a bass boat or speed boat, which provides power for mobile accessories, such as cameras and smart phones. The monopod may be fitted with extendable, bendable arms for mounting additional cameras or other electronic devices or for providing additional accessories.

BRIEF DESCRIPTION OF THE DRAWINGS

The drawings constitute a part of this specification and include exemplary embodiments of the present invention illustrating various objects and features thereof.

FIG. 10A is an isometric view from the base of yet another alternative embodiment of the present invention.

FIG. 10B is an isometric view from the top thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate.

Additional examples include a mobile smart device including a display device for viewing a typical web browser or user interface will be commonly referred to throughout the following description. The type of device, computer, display, or user interface may vary when practicing an embodiment of the present invention. Said terminology will include the words specifically mentioned, derivatives thereof and words of similar meaning.

Power providing inputs in the embodiment of the invention may encompass any format of Uniform Serial Bus (USB) input, 12V input, or any other type of power adapter. However, the embodiment of the present invention is intended only to be inserted into the navigation light port located on a marine vessel. The marine vessel applies to any type of boat, ship, or any other waterborne vessel which encompasses a navigation light port. A standard navigation light port is considered to be a port on a marine vessel which is required by the International Regulations for Preventing Collisions at Sea.

II. Preferred Embodiment Marine Monopod System 2

Figure 1:
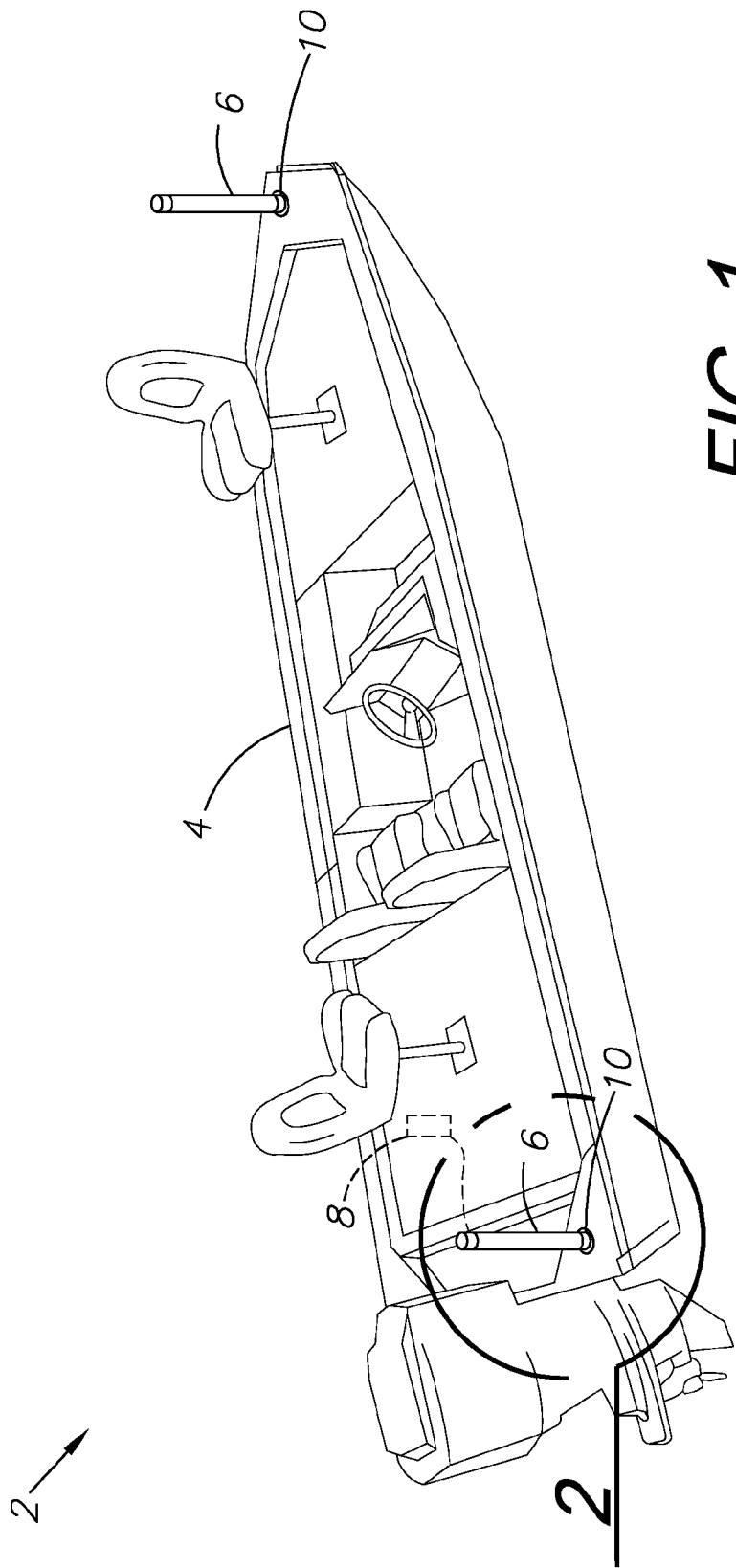
FIG. 1 is an isometric view of an embodiment of the present invention located in a typical environment in which it may be deployed, herein depicted as a bass fishing boat.

Referring to the figures in more detail, FIG. 1 shows a marine vessel 4 employing a marine monopod system 2. The monopod system 2 includes a monopod 6 which is inserted into a navigation light power port 10 and draws power from the port for electronic devices 8, such as smart phones, cameras, global positioning system (GPS) devices, and other mobile electronic devices. Note that a second navigation light power port 10 is located at the front of the vessel 4, which may accommodate a second monopod 6. Other ports may be located in other locations around the vessel.

Figure 2:
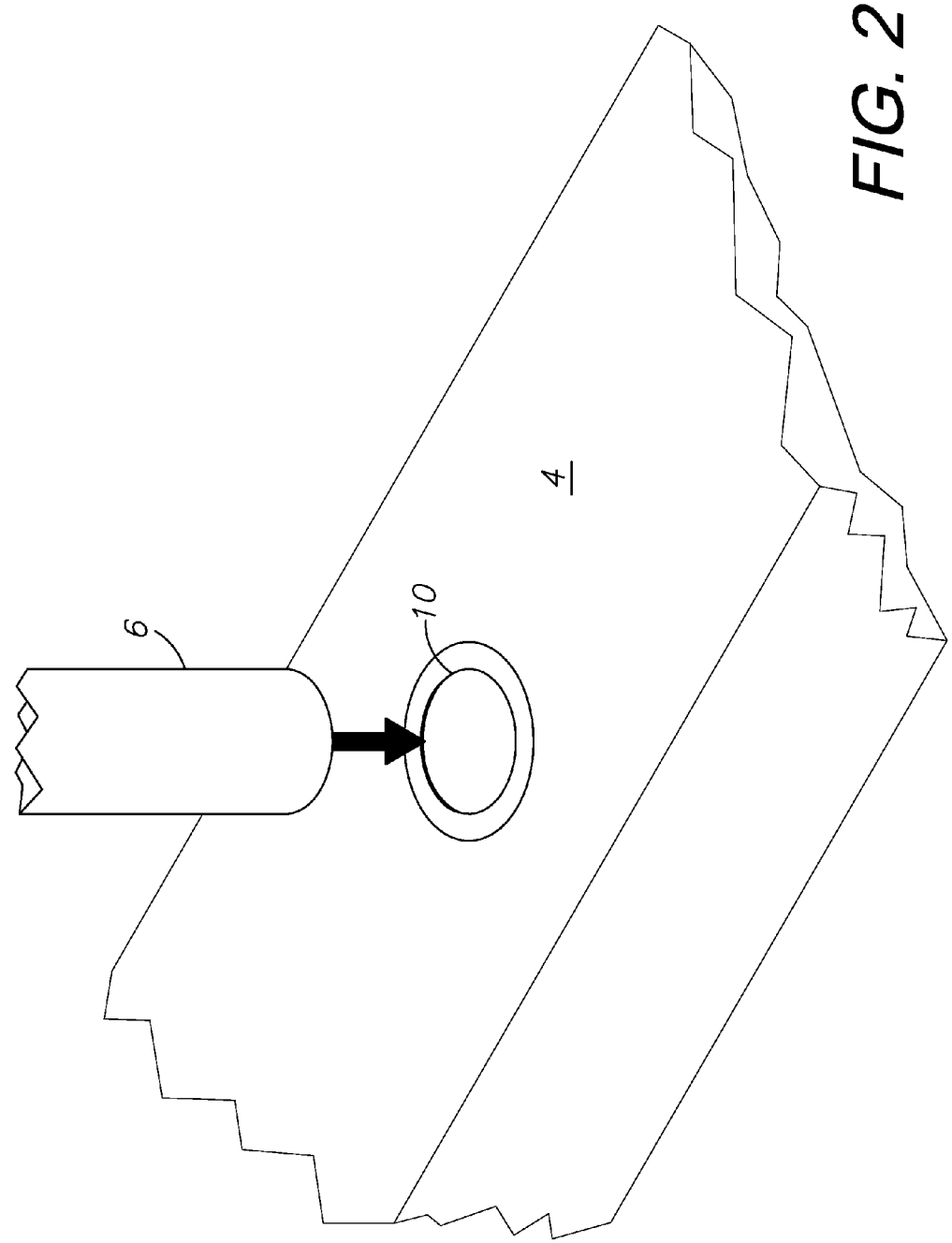
FIG. 2 is a detailed isometric view thereof, taken about the circle on FIG. 1.
Figure 3B:
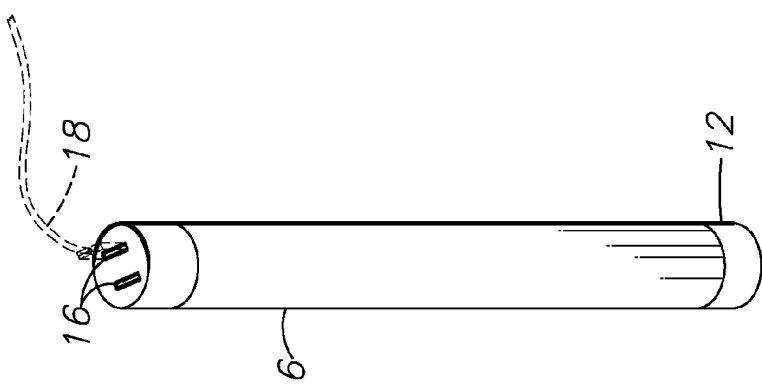
FIG. 3B is an isometric view from the top thereof.
Figure 3A:
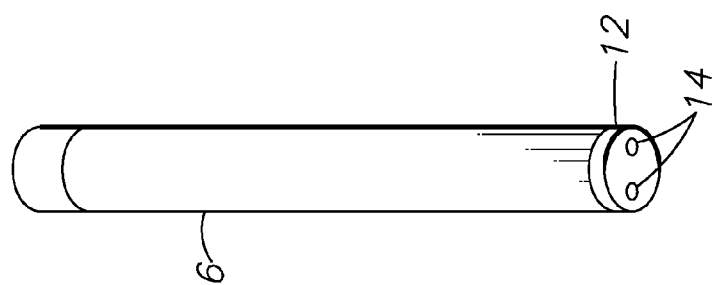
FIG. 3A is an isometric view from the base of an embodiment of the present invention.

FIG. 2 shows a closer view of the monopod 6 being inserted into the power port 10. FIGS. 3A and 3B show more detail of the monopod 6. This embodiment includes a monopod base 12 with contacts 14 for drawing power from the power port 10. A pair of Universal Serial Bus (USB) ports 16 are shown on the top portion of the monopod. Cables 18 for charging mobile devices may be inserted into these ports, and power is drawn from the power port 10. Other types of power adapters, such as 12V adapters, may be used instead of USB ports.

Figure 4:
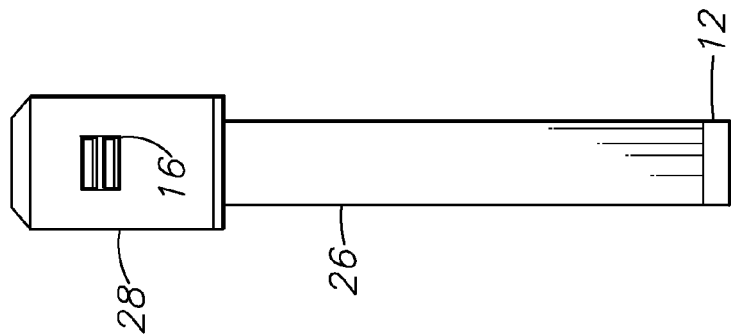
FIG. 4 is a front elevational view of an alternative embodiment thereof.

FIG. 4 shows an alternative embodiment monopod 26 which includes a head portion 28 with the USB ports 16 mounted on one or more sides of the head portion.

III. Alternative Embodiment Marine Monopod System 52

Figure 5:
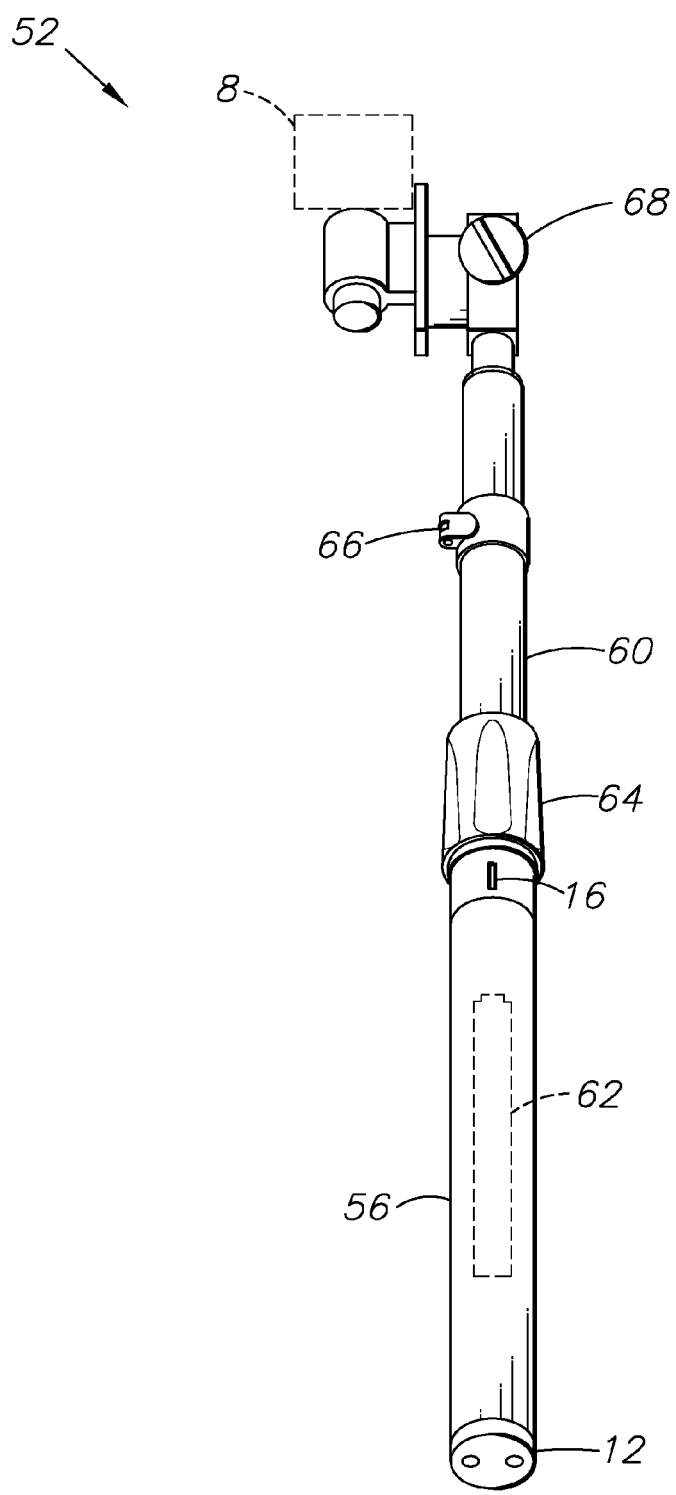
FIG. 5 is an isometric view of another embodiment of the present invention.

FIG. 5 shows an alternative marine monopod system 52 which uses a base monopod 56 with a telescoping arm 60 capable of extending a few inches or several feet above or away from the marine vessel. The monopod 56 includes the same base 12 for connecting with the navigation light port 10 and at least one USB port 16 for powering an accessory 8. Here, it is likely that the accessory is a camera for capturing video images, but the accessory could be any electronic device.

The telescoping arm 60 may be connected to the base monopod 56 with an adjustable handle 64 which tightens or loosens to allow telescoping of the arm 60. Other means may be employed which allow the arm to telescope. A second telescoping motion may be employed by releasing a locking device 66 at a second point along the arm 60. This locking device as shown can be quickly unlocked or locked using one finger.

The base monopod 56 may include a rechargeable battery 62, allowing the monopod to power or charge a device 8 even when it is not inserted into the navigational light port 10. An accessory mount 68, such as the screw-based camera mount shown here, may be connected to the top of the telescoping arm 60.

IV. Alternative Embodiment Monopod System 102

Figure 6:
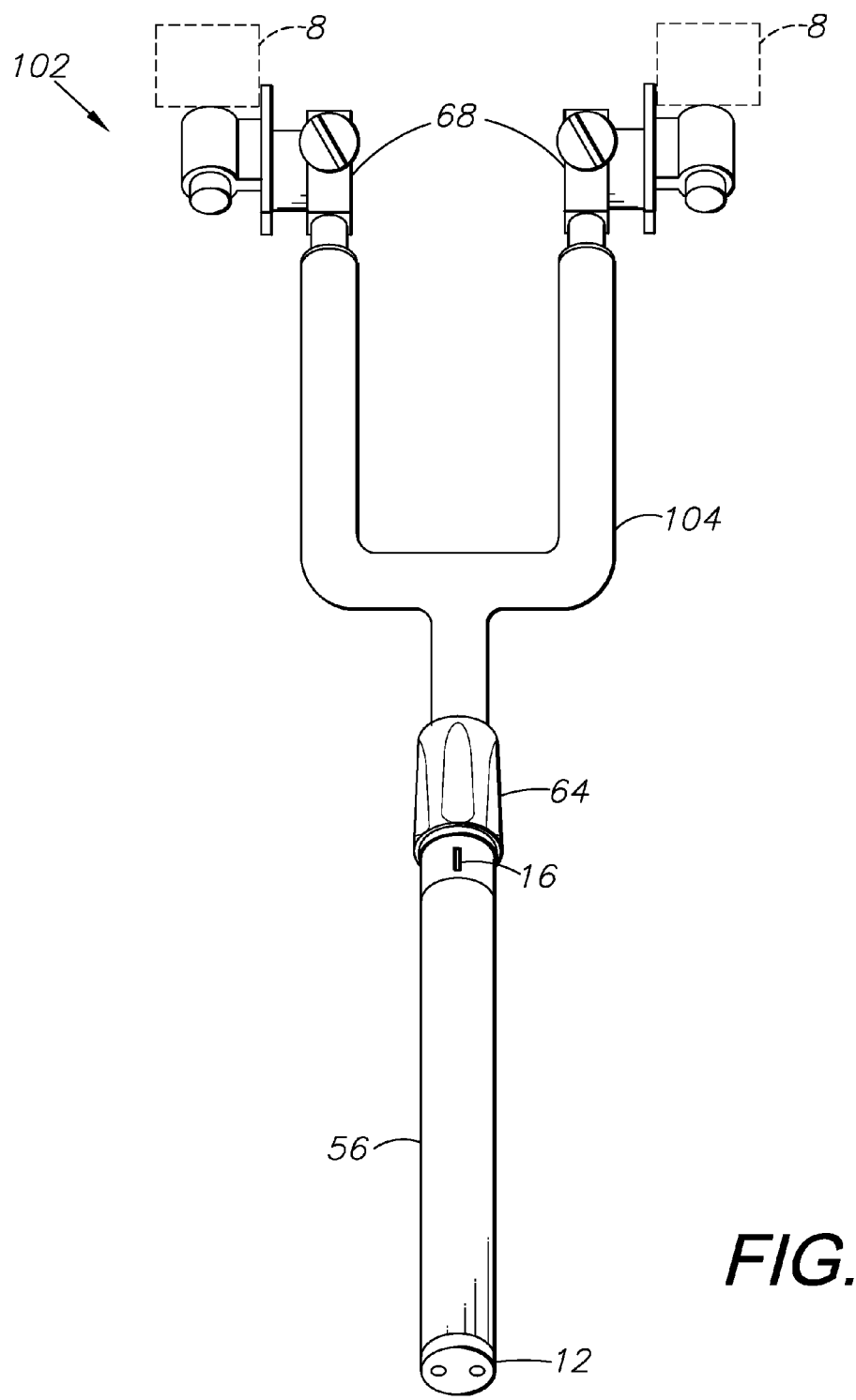
FIG. 6 is an isometric view of yet another embodiment of the present invention.

FIG. 6 employs many of the same features as the system 52 described above, but instead of the telescoping arm 60 of system 52, this system employs a forked arm 104 which is connected to the base monopod 56, and which allows for two devices to be connected to the same monopod system 102. In this way, one camera could face forward while the other faces away. Alternatively, two devices could charge simultaneously while being used.

V. Alternative Embodiment Monopod System 152

Figure 7:
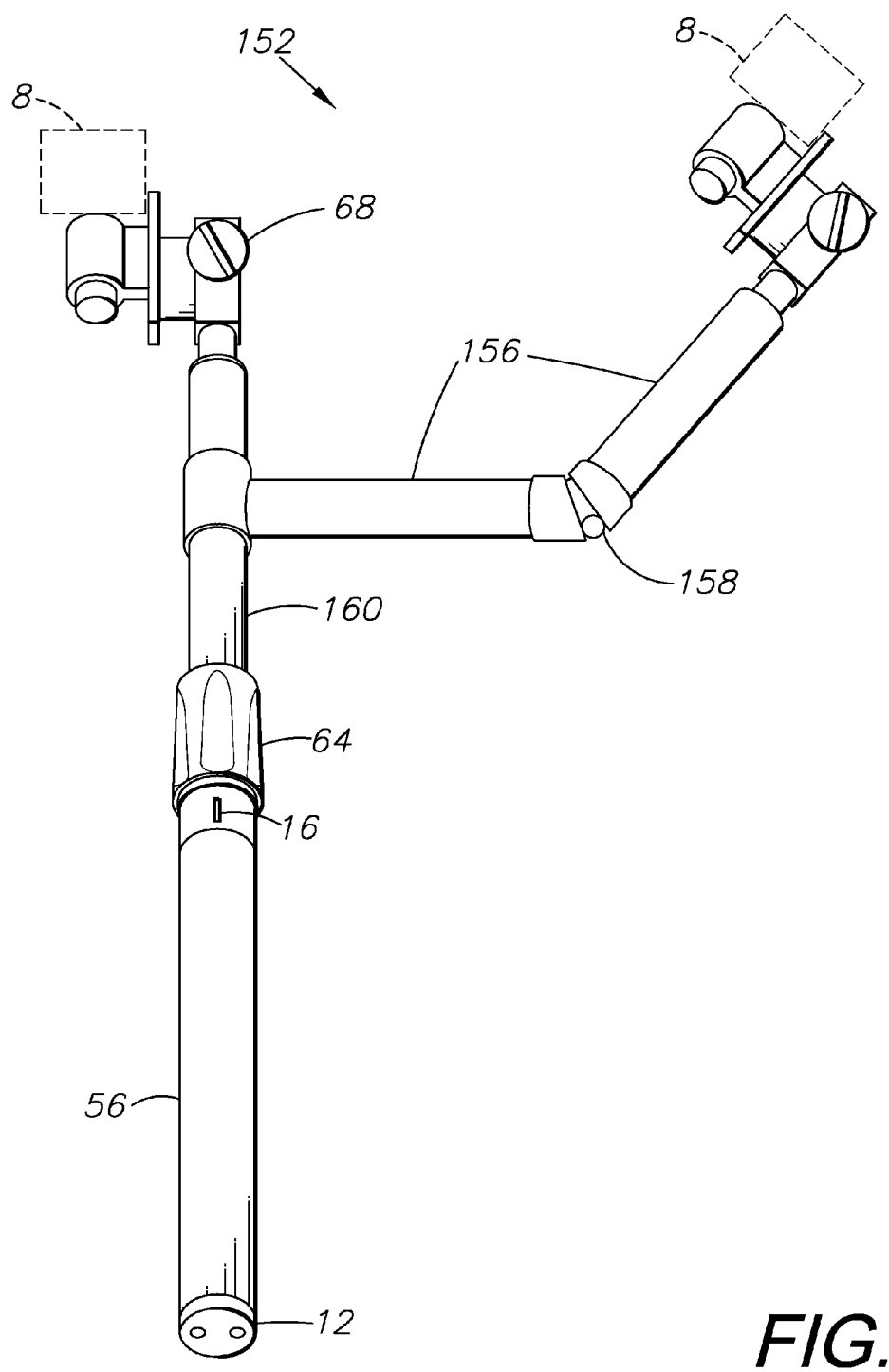
FIG. 7 is an isometric view of yet another embodiment of the present invention.

FIG. 7 shows an alternative embodiment monopod system 152 which uses the same base monopod 56 setup as systems 52 and 102, but which includes a telescoping arm 160 which allows an extension arm 156 to connect to the telescoping arm 160, either using a clip, a connecting ring, or some other connecting device. The extension arm 156 may culminate at an elbow 158, which may connect to a second extension arm 156 as shown. This type of connection could occur several times. It is important that the elbow 158 contain significant resistance against being bent such that the arms 156 retain any angle they are set at. This allows for dynamic camera angles using cameras as the electrical accessories. For example, in a boat, the extension arm 156 could place a camera close to the water as the boat moves through the water, while the other camera is placed far above the boat. The two cameras would capture video simultaneously.

Additional extension arms may be placed for two, three, four, or more camera angles.

Figure 8:
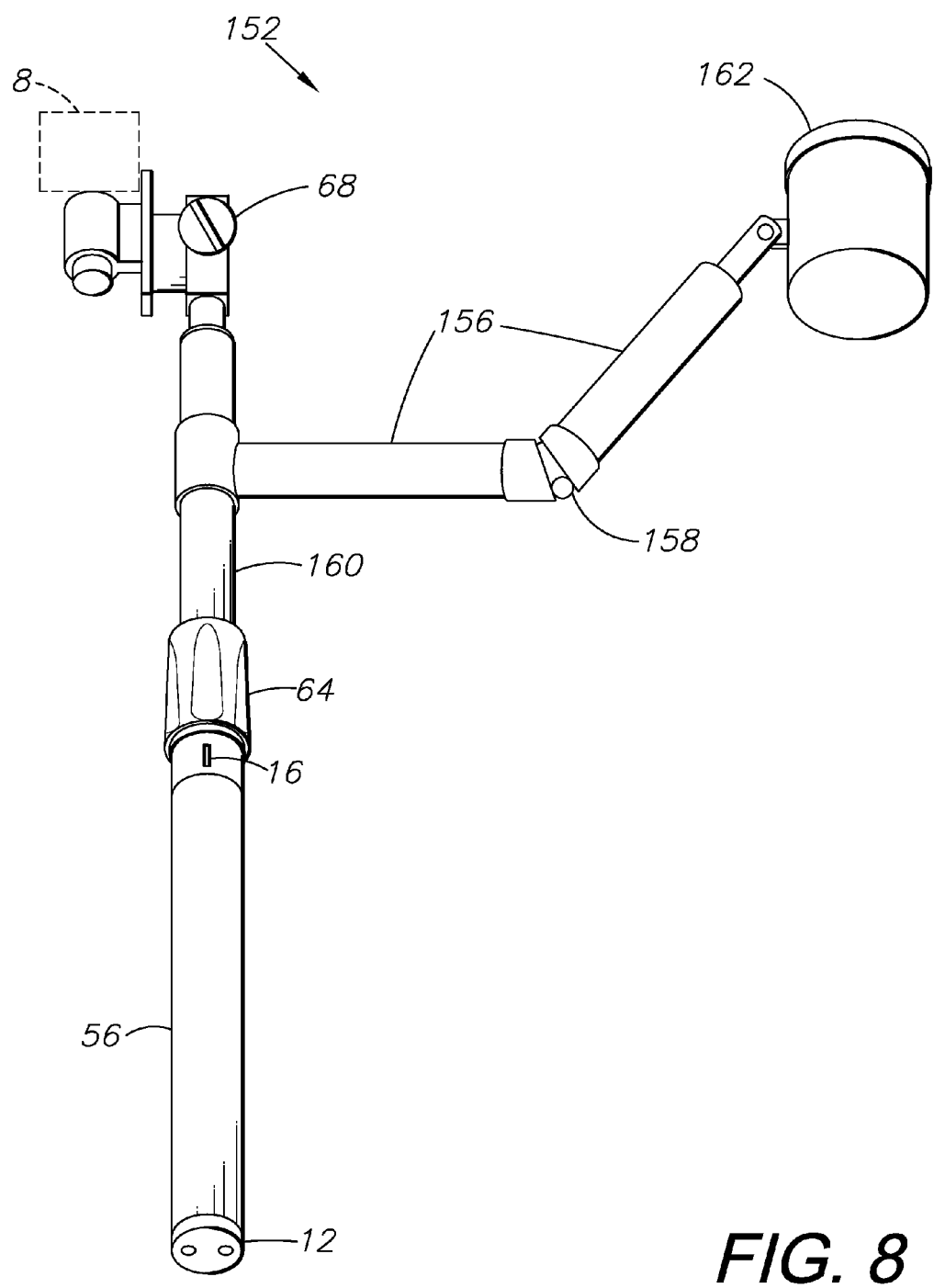
FIG. 8 is an alternative isometric view thereof, showing a cup holder accessory.
Figure 9:
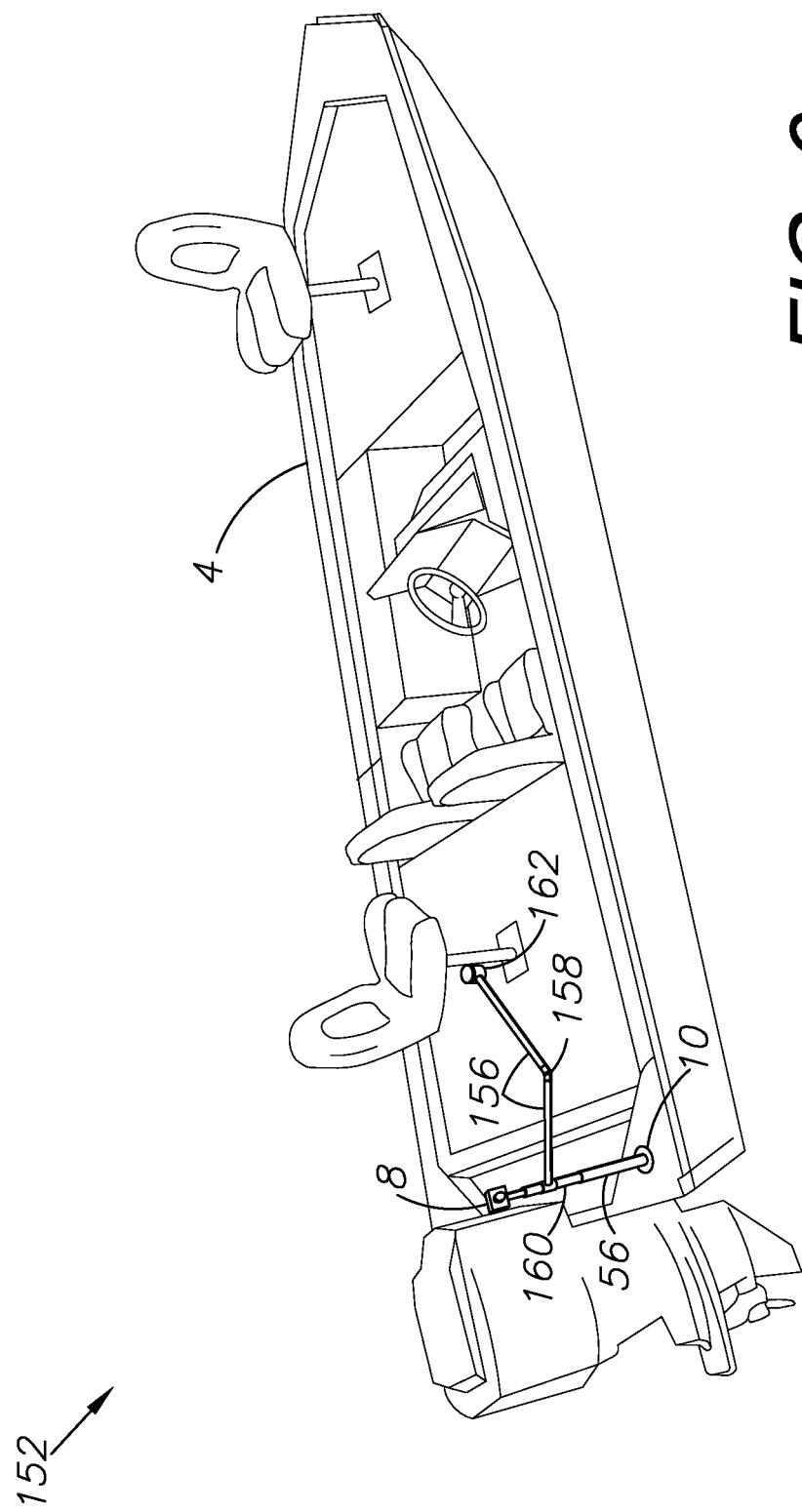
FIG. 9 is an isometric view of the embodiment of FIG. 8 located in a typical environment in which it may be deployed, herein depicted as a bass fishing boat.

Alternatively, as shown in FIG. 8, the accessory may instead be a cup holder 162. It is common for bass fishing boats or older boats to lack sufficient space to store drinks, especially when a fisherman is in the fishing seat. FIG. 9 shows how the arm can be positioned to provide a cup holder to the fisherman while a camera is still filming from atop the telescoping arm 160.

VI. Alternative Embodiment Monopod System 202

FIGS. 10A and 10B employ a monopod 206 which includes a basic navigational lamp 228 atop the monopod 206. As shown, two USB ports 16 are located atop the lamp. However, the USB ports could be placed along the sides of the monopod 206, and an accessory mount, such as those shown in FIGS. 5-8 above, may be placed atop the lamp. This would allow for a camera to be mounted to the navigational lamp and filming to take place even while the navigational light is in use or at night.

It should be noted that any and all commercial electronic devices could benefit from the present invention. GPS devices, fish finders, and tablet computers would be at the fisherman's fingertips using one or more of the embodiments of the present invention without the fisherman leaving the fishing chair.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A monopod for interfacing with the navigation light port of a marine vessel, said monopod comprising:
a cylindrical elongated body portion having a proximal end and a distal end;
a base portion located in proximity to the proximal end of said elongated body, said base portion configured to interface with a navigation light port of a marine vessel;
a tip portion located in proximity to the distal end of said elongated body;
wherein said monopod is configured to interface with a portable accessory;
said tip portion comprising at least one power port, said power port capable of providing electrical power to said portable accessory;
said navigation light port providing said electrical power for said power port;
said tip portion further comprising an accessory mount configured for receiving and connecting said portable accessory; and
said tip portion configured to position said portable accessory such that a power cable is capable of connecting said at least one power port to said portable accessory.

2. The monopod of claim 1, wherein said power port comprises a universal serial bus (USB) port.

3. The monopod of claim 1, wherein said portable accessory is one of the accessories chosen from the list comprising: a smart phone; a tablet computer; a digital camera; a geographical positioning system (GPS) unit; and a fish finder.

4. The monopod of claim 1, further comprising:
a telescoping arm comprising a proximal end and a distal end, said telescoping arm proximal end affixed to said tip portion, and said telescoping arm distal end comprising an interface configured to hold said portable accessory;

said telescoping arm comprising at least a first arm portion and a second arm portion, wherein said first arm portion is configured to envelop said second arm portion; and a locking element configured to lock said second arm portion in a telescoping position relative to said first arm portion.

5. The monopod of claim 4, further comprising:

a bendable arm pivotally connected to said telescoping arm, said bendable arm comprising at least two arm segments hinged at an elbow; and said bendable arm comprising an interface configured to hold a second portable accessory.

6. The monopod of claim 5, wherein said portable accessory is one of the accessories chosen from the list comprising: a smart phone; a tablet computer; a digital camera; a geographical positioning system (GPS) unit; a fish finder; and a cup holder.

7. The monopod of claim 1, further comprising:

a forked accessory stand affixed to said tip portion, said accessory stand comprising a single base post affixed to said tip portion, said base post terminating at a cross member, and at least two branch posts branching away from said cross member; and each said branch post terminating at an interface, each interface configured to hold a portable accessory.

8. The monopod of claim 7, wherein said portable accessory is one of the accessories chosen from the list comprising: a smart phone; a tablet computer; a digital camera; a geographical positioning system (GPS) unit; a fish finder; and a cup holder.

9. A method of mounting an accessory to a marine vessel, the method comprising:

connecting monopod to a navigation light port of said marine vessel, said monopod comprising a cylindrical elongated body portion having a proximal end and a distal end, wherein said proximal end is inserted into said navigation light port;

interfacing said monopod with a portable accessory in proximity with said distal end of said monopod;

telescoping a telescoping arm affixed to said distal end of said elongated cylindrical body of said monopod, said arm comprising an interface configured to receive said portable accessory;

said telescoping arm configured to be extended from a first, compact position to a second, extended position; and locking said telescoping arm into said second, extended position with a locking mechanism.

10. The method according to claim 9, further comprising the steps:

providing electrical power from said navigation light port through a base portion of said monopod, said base portion being located at the proximal end of said monopod cylindrical elongated body; and transferring power from said monopod to said portable accessory via a power port located on said monopod.

11. The method according to claim 10, wherein said power port comprises a universal serial bus (USB) port.

12. The method according to claim 10, wherein said portable accessory is one of the accessories chosen from the list comprising: a smart phone; a tablet computer; a digital camera; a geographical positioning system (GPS) unit; and a fish finder.

13. The method according to claim 9, further comprising the steps:

affixing a bendable arm to said telescoping arm such that said bendable arm is configured to pivot about said telescoping arm, said bendable arm comprising at least two arm segments hinged at an elbow, and further comprising a second an interface configured to receive a second portable accessory; and positioning said bendable arm such that said second portable accessory is located in a desired position.

14. The method according to claim 9, further comprising the steps:

affixing a forked accessory stand affixed to said distal end of said elongated cylindrical body, said accessory stand comprising a single base post affixed to said tip portion, said base post terminating at a cross member, and at least two branch posts branching away from said cross member; and each said branch post terminating at an interface, each said interface configured to hold a portable accessory.

15. The method according to claim 14, wherein said portable accessory is one of the accessories chosen from the list comprising: a smart phone; a tablet computer; a digital camera; a geographical positioning system (GPS) unit; and a fish finder.

* * * * *